P. Ball.
Water Pipe Joint.
N° 91,594.      Patented Jun. 22, 1869.
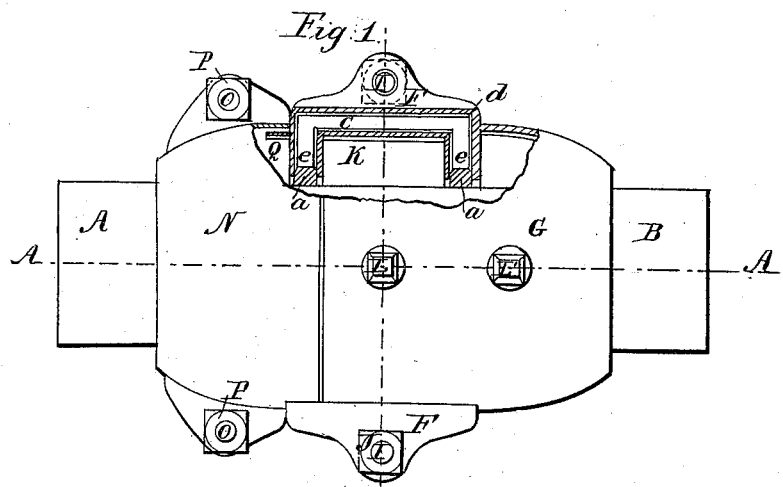
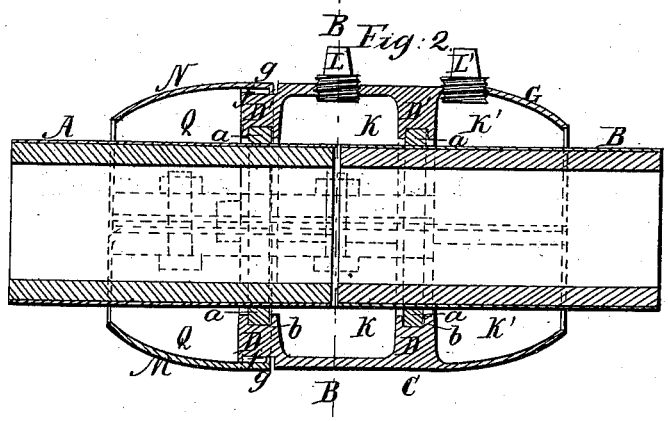
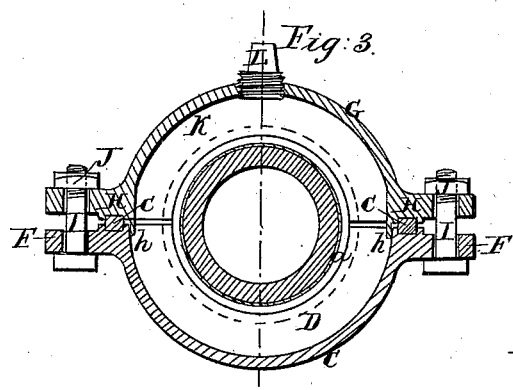
Witnesses:
Thos. L. C. Dodge
D. L. Miller
Inventor,
Phinehas Ball

United States Patent Office.

PHINEHAS BALL, OF WORCESTER, MASSACHUSETTS.

Letters Patent No. 91,594, dated June 22, 1869.

IMPROVEMENT IN CLAMPS FOR JOINING CEMENT-LINED WATER-PIPES.

The Schedule referred to in these Letters Patent and making part of the same.

*To all whom it may concern:*

Be it known that I, PHINEHAS BALL, of the city and county of Worcester, and Commonwealth of Massachusetts, have invented certain new and useful Improvements in Joints for Cement-Lined Water-Pipes, of which the following is a full, clear, and exact description, reference being had to the accompanying drawings, forming a part of this specification, in which—

Figure 1 represents a top or plan view of my improved joint, with a portion of the casing shown broken away;

Figure 2 represents a longitudinal section on line A A, fig. 1; and

Figure 3 shows a section on line B B, with the cap unbroken.

To enable those skilled in the art to which my invention belongs, to make and use the same, I will describe it more in detail.

The nature of my invention consists—

First, in the combination, with the ends of the pieces of pipe to be jointed or coupled, of two rubber rings, and two metallic clamping-pieces, provided with rubber packing, as hereafter explained.

Second, of two clamping-pieces, made in the peculiar manner described.

Third, the combination, with the main clamping-pieces, of two auxiliary clamping-pieces, as hereafter described.

In the drawings—

A B represent the ends of two sections of cement-lined water-pipe to be joined.

The ends of the pipes being arranged close together, rubber rings *a a* are secured to the ends of the pipes at proper distances apart, said rubber rings being formed from strips of rubber made for that purpose, the ends of the rubber being cut bevelling, to match each other and make perfect joints, as shown in full and dotted lines, fig. 3. To retain the rubber rings in place temporarily, it is only necessary to tack or pin the bevelled ends together.

The under clamping-piece C is now placed under the ends of the pipe, in such a manner that the rubber rings *a* will fit into grooves *b* in the inner projections, or flanges D D of said clamping-piece.

Rubber packing-pieces *c* are now placed in the groove *d*, in the ears F F, after which the upper clamping-piece G is placed on top of the ends of the pipe, and so that the grooves in its inner projections or flanges D' D', and its ears H H, will fit the rubber rings *a*, and rubber packing-pieces *c*; after which the two clamping-pieces C G are drawn together by means of the bolts I I and nuts J J, thereby compressing the rubber rings *a a* close about the ends of the pipes A B, and making a perfect water-tight joint longitudinally, while the compression of the rubber pieces of packing *c*, make the joint water-tight laterally, the inner ends *e e*, of the rubber packing-pieces *c*, being forced close against the rubber rings *a*, as fully indicated in fig. 1.

After the clamping-pieces C G have been drawn sufficiently close together, the chambers K K' are filled with plastic cement turned in through openings in the top clamping-piece G, which holes may be stopped after the plastic cement has been run in, by means of the screws L L'. It will be observed that the chambers K K' do not connect with each other, but are separated by the rubber packing-ring *a*.

The left-hand ends of the clamping-pieces C G are provided with recesses *f f*, to receive the flanges *g g* of the auxiliary clamping-pieces M N, which are clamped about the pipe, and the clamping-pieces C G, by means of bolts O O and nuts P P, forming a chamber, Q Q, and which chamber may be filled with plastic cement, by means of a hole in the cap or upper clamping-piece N, although I prefer to apply the cement about the pipe before applying the auxiliary clamping-pieces M N, whereby, when the latter are drawn close together, the cement is forced compactly about the pipe, and also against the outside of the packing-ring *a*. By means of the auxiliary clamping-pieces M N, a perfect joint can be formed, although the ends of the pipes to be joined may be arranged a little angling to each other, and which is of frequent occurrence in laying pipes in streets, especially in streets where curves occur.

The upper clamping-piece G is provided with flanges *h h*, which project down upon the inside of the clamping-piece C, as indicated in fig. 3, thereby permanently securing the proper relative position of the two clamping-pieces.

The object of the rubber packing-rings *a a*, and packing-pieces *c c*, is to secure the joint until after the cement has become perfectly set and hard in the chambers K K' and Q.

My invention has been tested recently upon a pipe in which the pressure of water was upwards of seventy pounds to the square inch, the water being let on as soon as the joint was formed, and while the cement was fresh and unset, and no leakage of water was visible.

If preferred, the flanges *h h* may be made to project from the under sides of the ears H H, on the outside of the groove in which the rubber packing *c* is placed, recesses for their reception being formed in the upper sides of the ears F F.

In some cases it is necessary to form what is called "spicket"-joint, one pipe being slipped into another. In such cases the flanges D D' on one end of the clamping-pieces should be made to extend in further than the other end, to correspond to the size of the smaller pipe.

Having described my improved joint for cement-lined water-pipes,

What I claim therein as new and of my invention, and desire to secure by Letters Patent, is—

1. The clamping-pieces C G, made with flanged recesses to receive and retain the packing, while at the same time properly supporting the cement-filling, substantially as shown and described.

2. The combination, with the ends of the pipes, of the packing-rings $a\ a$ and clamping-pieces C G, substantially as shown and described.

3. The combination, with the ends of the pipe and clamping-pieces, C G, of the rubber packing-rings $a\ a$, and packing-pieces $c\ c$, substantially as and for the purposes set forth.

4. The combination, with the clamping-pieces C G, of the auxiliary pieces M N, substantially as and for the purposes set forth.

PHINEHAS BALL.

Witnesses:
    THOS. H. DODGE,
    D. L. MILLER.